US009200128B2

United States Patent
Chun et al.

(10) Patent No.: US 9,200,128 B2
(45) Date of Patent: Dec. 1, 2015

(54) RESIN COMPOSITION FOR FOAMING CONTAINING BIODEGRADABLE RESIN, AND FOAM MANUFACTURED THEREFROM

(71) Applicant: SAMSUNG FINE CHEMICALS CO., LTD, Ulsan (KR)

(72) Inventors: Jong Pil Chun, Daejeon (KR); Hee Soo Kim, Gyeonggi-do (KR); Soo Youn Choi, Jeollabuk-do (KR); Ye Jin Kim, Seoul (KR); Ki Chull Yun, Chungcheongnam-Do (KR); Min Kyoung Kim, Seoul (KR)

(73) Assignee: SAMSUNG FINE CHEMICALS CO., LTD, Ulsan (KR)

( * ) Notice: Subject to any disclaimer, the term of this patent is extended or adjusted under 35 U.S.C. 154(b) by 0 days.

(21) Appl. No.: 14/403,409

(22) PCT Filed: May 13, 2013

(86) PCT No.: PCT/KR2013/004228
§ 371 (c)(1),
(2) Date: Nov. 24, 2014

(87) PCT Pub. No.: WO2014/021544
PCT Pub. Date: Feb. 6, 2014

(65) Prior Publication Data
US 2015/0119481 A1    Apr. 30, 2015

(30) Foreign Application Priority Data
Jul. 30, 2012   (KR) .................. 10-2012-0083244

(51) Int. Cl.
*C08J 9/00* (2006.01)
*C08J 9/14* (2006.01)
*A43B 13/04* (2006.01)
*C08L 31/04* (2006.01)
*C08J 9/06* (2006.01)

(52) U.S. Cl.
CPC ................. *C08J 9/142* (2013.01); *A43B 13/04* (2013.01); *C08J 9/0061* (2013.01); *C08J 9/0066* (2013.01); *C08J 9/06* (2013.01); *C08L 31/04* (2013.01); *C08J 2201/026* (2013.01); *C08J 2201/03* (2013.01); *C08J 2203/02* (2013.01); *C08J 2203/04* (2013.01); *C08J 2323/08* (2013.01); *C08J 2331/04* (2013.01); *C08J 2400/16* (2013.01); *C08J 2467/06* (2013.01)

(58) Field of Classification Search
CPC ....................................... C08J 9/0061
USPC ............. 521/91, 103, 137; 524/101, 104, 128
See application file for complete search history.

(56) References Cited

U.S. PATENT DOCUMENTS

| 5,346,934    | A  * | 9/1994 | Chriss ............................. 524/11 |
| 2006/0140688 | A1 * | 6/2006 | Kinpara et al. ............... 399/328 |
| 2009/0162683 | A1 * | 6/2009 | Douard ......................... 428/480 |
| 2013/0139410 | A1 * | 6/2013 | Dirsa et al. ...................... 36/103 |

FOREIGN PATENT DOCUMENTS

| JP | 8-59892       | A  | 3/1996 |
| KR | 1998-072370   | A  | 11/1998 |
| KR | 2000-0059820  | A  | 10/2000 |
| KR | 10-2005-0087967 | A | 9/2005 |
| KR | 10-1038038    | B1 | 5/2011 |

OTHER PUBLICATIONS

International Search Report for corresponding International Application No. PCT/KR2013/004228, mailed Aug. 12, 2013 (3 pages).

* cited by examiner

*Primary Examiner* — Terressa Boykin
(74) *Attorney, Agent, or Firm* — Osha Liang LLP

(57) ABSTRACT

There are provided a resin composition for foaming including a biodegradable resin and a foamed article made thereof. The resin composition for foaming according to the present invention includes an ethylene-vinyl acetate resin, a biodegradable polyester resin containing a monomer of a double bond compound, a cross-linking agent, a co-crosslinking agent, a filler, and a foaming agent. In the resin composition, the double bond in the biodegradable polyester resin can be chemically cross-linked to the ethylene-vinyl acetate resin by a cross-linking agent, so that a compatibility with the ethylene-vinyl acetate resin can be improved, processability (mold releasability) during a mixing and melting process can be improved, and a foaming property and a mechanical property of a foamed article can be remarkably improved.

9 Claims, No Drawings

RESIN COMPOSITION FOR FOAMING CONTAINING BIODEGRADABLE RESIN, AND FOAM MANUFACTURED THEREFROM

CROSS-REFERENCE TO RELATED APPLICATION

This application claims priority to and the benefit of Korean Patent Application No. 2012-0083244, filed on Jul. 30, 2012, the disclosure of which is incorporated herein by reference in its entirety.

BACKGROUND

1. Field of the Invention

The present invention relates to a resin composition for foaming and a foamed article made thereof, and more particularly, to a resin composition for foaming with a foaming property improved by applying a biodegradable polyester resin containing a monomer of a double bond compound to an ethylene-vinyl acetate (EVA) resin as a polymer for foaming, and a foamed article made thereof with excellent properties.

2. Discussion of Related Art

Synthetic resin-based foamed articles that are usefully used are made of various materials such as polyethylene, polypropylene, an ethylene-vinyl acetate copolymer, polyester, and polyurethane.

Among those, an ethylene-vinyl acetate resin-based foamed article is produced by various molding methods such as a typical press foam molding method and an injection foam molding method. Since the ethylene-vinyl acetate resin-based foamed article is light and cheap, but does not discolor, it has widely been used.

An important technical matter for the foamed article is eco-friendly manufacturing plastic which has an excellent processability without a decrease in mechanical property This is urgently demanded technique condition for manufacturing a foamed article. Conventionally, if a cross-linking foamed article using a composition for foaming comprising an ethylene-vinyl acetate resin, azodicarbonamide, and organic peroxide is discarded and buried in the ground, it is hardly biodegraded. If the cross-linking foamed article is incinerated, the harmful gases such as dioxin or VOC are generated. Therefore, it is likely to disturb the ecosystem by destruction of the environment or the like.

Accordingly, a mixture of a biodegradable polymer resin and an ethylene-vinyl acetate resin has been used to introduce eco-friendly bio plastic. However, by way of example, a foamed article comprised of a mixture of polylactic acid and an ethylene-vinyl acetate resin has a low compatibility with the ethylene-vinyl acetate resin, so that the foamed article cannot have a desired form, for example, a foaming property such as a uniform foam size, resulting in a decrease in mechanical property. In particular, polylactic acid has many problems in that, for example, it cannot be processed at a typical process temperature due to its high melting temperature and a low thermal property.

There have been carried out studies to solve conventional problems with a cross-linking foamed article using a composition for foaming based on a mixture of an ethylene-vinyl acetate resin and other resins in various ways. However, such a cross-linking foamed article does not have a sufficient performance.

By way of example, a foaming property is improved by using a mixture of an ethylene-vinyl acetate resin as a polymer for foaming with a catalytic cross-linking agent (dicumyl peroxide) as a cross-linking supplemental agent, a co-crosslinking agent (triallyl cyanurate), and a foaming agent (azodicarbonamide). However, even in such a case, if a mixture of an ethylene-vinyl acetate resin with a biodegradable polyester resin of 25% or more is used, processability decreases. After a chemical cross-linking, a foaming property of the biodegradable polyester resin is partially expressed independently from the ethylene-vinyl acetate resin, resulting in deterioration of a foam size and a shape of a foamed article. As described above, there are still problems with the biodegradable polyester resin.

Therefore, there has urgently been demanded a good foamed article which is not only eco-friendly but also improved in foaming and mechanical property.

In this regard, the present inventors researched a resin composition for foaming, and as a result, found that if a biodegradable polyester resin containing a monomer of a double bond compound is mixed with an ethylene-vinyl acetate resin, the double bond included in the biodegradable polyester resin is chemically cross-linked to the ethylene-vinyl acetate resin by a cross-linking agent, resulting in improvement in compatibility, so that processability and a foaming property can be improved and further a mechanical strength of a foamed article can be improved. Thus, the inventors finally completed the present invention.

SUMMARY OF THE INVENTION

The present invention is directed to providing a resin composition for foaming comprising a biodegradable resin, the resin composition having improved processability and foaming property, and improving a mechanical property of a foamed article.

Further, the present invention is directed to providing a foamed article made of a resin composition for foaming comprising a biodegradable resin, the resin composition having improved processability and foaming property, and improving a mechanical property of the foamed article.

In order to achieve the object as mentioned above, according to an aspect of the present invention, there is provided a resin composition for foaming, including: an ethylene-vinyl acetate resin; a biodegradable polyester resin bonding a monomer having a double bond; a cross-linking agent, a co-crosslinking agent, a filler, and a foaming agent.

In the resin composition for foaming of the present invention, preferably, the biodegradable polyester resin may be used in the amount ranging from 20% by weight to 50% by weight with respect to the ethylene-vinyl acetate resin.

Preferably, the monomer having a double bond that is bonded to the biodegradable polyester resin may be included in a mole ratio of from 0.003 to 0.2.

Preferably, the biodegradable polyester resin may be selected from polyester resins bonding monomers including unsaturated acids, unsaturated isocyanates, unsaturated alcohols, or unsaturated hydroxy carboxylic acids with two or more functional groups as the monomer having a double bond. To be specific, preferably, the biodegradable polyester resin may be selected from PBAF (polybutyleneadipate-co-fumarate), PBAI (polybutyleneadipate-co-itaconate), PBSAF (polybutylenesuccinate-co-adipate-co-fumarate), PBSAI (polybutylenesuccinate-co-adipate-co-itaconate), PBSF (polybutylenesuccinate-co-fumarate), or PBSI (polybutylenesuccinate-co-itaconate).

Preferably, the resin composition for foaming according to the present invention may include a cross-linking agent in the amount of 0.1 parts to 10 parts by weight, a co-crosslinking agent in the amount of 0.1 parts to 5 parts by weight, a filler in the amount of 0.1 parts to 5 parts by weight, and a foaming agent in the amount of 1 part to 10 parts by weight with respect to 100 parts by weight of the total weight of the ethylene-vinyl acetate resin and the biodegradable polyester resin.

In order to achieve another object as mentioned above, according to another aspect of the present invention, there is provided a foamed article foam-molded of a resin composition for foaming, including: an ethylene-vinyl acetate resin; a biodegradable polyester resin bonding a monomer having a double bond; a cross-linking agent; a co-crosslinking agent; a filler; and a foaming agent.

Preferably, the foamed article according to the present invention may be foamed by a foam molding method including a press foam molding method or an injection foam molding method. The foamed article may be used as a sole, a midsole, or an insole of a shoe.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The resin composition for foaming according to the present invention, the resin composition being capable of improving processability (mold releasability), foaming property, and a mechanical property of a foamed article, includes an ethylene-vinyl acetate resin; a biodegradable polyester resin bonding a monomer having a double bond; a cross-linking agent; a co-crosslinking agent; a filler; and a foaming agent.

The ethylene-vinyl acetate resin may have a weight-average molecular weight of from 100,000 to 300,000, and preferably from 160,000 to 250,000, and may include vinyl acetate in the amount ranging from 10% by weight to 30% by weight, and preferably from 15% by weight to 25% by weight. Further, a melt index (ASTM D1238, 190° C., 2.16 kg) may be from 0.05 to 20.0 g/10 min, and more preferably, from 0.3 to 10.0 g/10 min.

The biodegradable polyester resin bonding a monomer having a double bond can be improved in processability (mold releasability) when being mixed and melted with the ethylene-vinyl acetate resin. Further, the double bond in the biodegradable polyester resin can be chemically cross-linked to the ethylene-vinyl acetate resin by the cross-linking agent, so that a foaming property and a mechanical strength of a foamed article can be remarkably improved. The double bond in the biodegradable polyester resin can be introduced into the biodegradable polyester resin by using and polymerizing an unsaturated compound including two or more functional groups having a double bond as the monomer.

The term "double bond" from the monomer having a double bond means a double bond of carbon-carbon, carbon-oxygen, or carbon-nitrogen besides a double bond of C=O present in a carboxylic group for the existing esterification.

The monomer having a double bond that is bonded to the biodegradable polyester resin may be selected from unsaturated acids, unsaturated isocyanates, unsaturated alcohols, or unsaturated hydroxy carboxylic acids with two or more functional groups. To be specific, there may be PBAF (polybutyleneadipate-co-fumarate) represented by the following Chemical Formula 1, PBAI (polybutyleneadipate-co-itaconate) represented by the following Chemical Formula 2, PBSAF (polybutylenesuccinate-co-adipate-co-fumarate), PBSAI (polybutylenesuccinate-co-adipate-co-itaconate), PBSF (polybutylenesuccinate-co-fumarate), and PBSI (polybutylenesuccinate-co-itaconate).

[Chemical Formula 1]

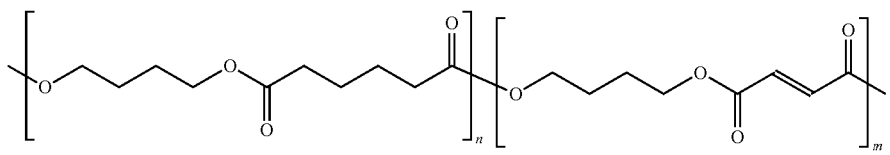

(Here, m and n represent relative mole ratios, and m is 0.003 to 0.2 and n is 0.8 to 0.997.)

[Chemical Formula 2]

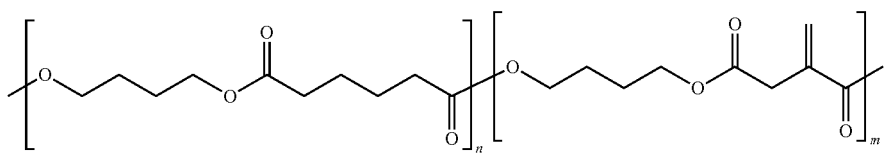

(Here, m and n represent relative mole ratios, and m is 0.003 to 0.2 and n is 0.8 to 0.997.)

The monomer having a double bond in the biodegradable polyester resin may be included in a mole ratio of, preferably from 0.003 to 0.2, and more preferably from 0.003 to 0.1. If the monomer having a double bond has a mole ratio of less than 0.003 in the biodegradable polyester resin, improvement in processability (mold releasability) during a mixing and melting process is insignificant and chemical cross-linking with the ethylene-vinyl acetate resin may be insignificant. If the monomer having a double bond has a mole ratio of more than 0.2 in the biodegradable polyester resin, a chemical cross-linking density with the EVA becomes too high, resulting in deterioration of a foaming property and color.

Herein, a mole ratio means a ratio of moles of monomers having a double bond with respect to the total moles of monomers constituting the biodegradable polyester resin that is a product.

The polyester resin bonding the monomer having a double bond may have a weight-average molecular weight of from 100,000 to 300,000, and preferably from 160,000 to 250,000. Further, a melt index (ASTM D1238, 190° C., 2.16 kg) may be from 0.05 to 20.0 g/10 min, and more preferably from 0.3 to 10.0 g/10 min.

The biodegradable polyester resin may be mixed in an amount of 20% by weight or more, and preferably in the range of from 20% by weight to 50% by weight with respect to the ethylene-vinyl acetate resin. If the amount of the biodegradable polyester resin is less than 10% by weight, a biodegradable effect on an eco-friendly bio plastic resin is insignificant, and thus the amount of the biodegradable polyester resin needs to be 20% by weight or more.

The resin composition for foaming according to the present invention includes a cross-linking agent, a co-crosslinking agent, a filler, and a foaming agent.

The cross-linking agent may be organic peroxide selected from, for example, dicumylperoxide, di-t-butylperoxide, 2,5-dimethyl-2,5-di(t-butylperoxy)hexane, 2,5-dimethyl-2,5-di(t-butylperoxyisopropyl)benzine, and 1,1-bis(t-butylperoxy)-3,3,5-trimethylcyclohexane. Preferably, the cross-linking agent may be used in the range of 0.1 parts to 10 parts by weight with respect to 100 parts by weight of the total weight of the ethylene-vinyl acetate resin and the biodegradable polyester resin. Here, if the cross-linking agent is used in the amount of less than 0.1 parts by weight, a degree of cross-linking may decrease or cross-linking may not occur. If the cross-linking agent is used in the amount of more than 10 parts by weight, cross-linking occurs and main chain scission also occurs, resulting in a decrease in molecular weight.

The co-crosslinking agent may be selected from triallyl cyanurate (TAC), triallyl isocyanurate (TAIC), trimethylolpropane trimethacrylate (TMPTMA), or trimethylolpropane triacrylate (TMPTA). Preferably, the co-crosslinking agent may be used in the range of 0.1 parts to 5 parts by weight with respect to 100 parts by weight of the total weight of the ethylene-vinyl acetate resin and the biodegradable polyester resin. Herein, if the co-crosslinking agent is used in the amount of less than 0.1 parts by weight, its function may be insignificant. If the co-crosslinking agent is used in the amount of more than 5 parts by weight, a cross-linking density between a main chain and the co-crosslinking agent becomes too high, resulting in deterioration of a foaming property.

Preferably, the filler may be an inorganic filler. The inorganic filler improves strength of a foamed article. By way of example, the inorganic filler may include calcium carbonate, titanium oxide, talc, an egg shell, and silica. The inorganic filler is not specifically limited in a particle diameter and may have a typical particle diameter of a resin composition. In the resin composition for foaming in the present invention, preferably, the inorganic filler may be contained in the range of 0.1 parts to 5 parts by weight with respect to 100 parts by weight of the total weight of the ethylene-vinyl acetate resin and the biodegradable polyester resin.

The foaming agent may include one or more kinds selected from the group consisting of an azo-based compound, a nitroso-based compound, a sulfonyl hydrazide-based compound, azobisisobutyronitrile, diazoaminoazobenzene, and sodium dicarbonate. To be specific, the foaming agent may include, but may not be limited to, an azo-based compound such as azodicarbonamide, a nitroso-based compound such as N,N'-dinitrosopentamethylenetetramine, azobisisobutyronitrile, p-toluensulfonyl hydrazide, p,p'-oxybisbenzenesulfonyl hydrazide, diazoaminoazobenzene, azodicarboxylic acid barium, and sodium bicarbonate. Preferably, the foaming agent may be used in the amount of 1 part to 10 parts by weight with respect to 100 parts by weight of the total weight of the ethylene-vinyl acetate resin and the biodegradable polyester resin in consideration of a foaming magnitude and a density. Here, if the foaming agent is used in the amount of less than 1 part by weight, a hardness of a foamed article may increase, resulting in an increase in specific gravity. If the foaming agent is used in the amount of more than 10 parts by weight, a foamed article may be torn or unstable foam cells may be formed.

In the present invention, an eco-friendly resin composition for foaming may include, if necessary, various processing aids such as a whitening enhancer, a dye, a pigment, an antioxidant, a lubricant, a flame retardant, an antistatic agent, an antimicrobial agent, a biodegradation enhancer, a heat-resistant stabilizer, an anti-weathering stabilizer, a photostabilizer, an ultra violet absorber, and an antiblocking agent in a range not to impair features of the present invention.

An eco-friendly foamed article using the resin composition for foaming according to the present invention may be manufactured by, but not limited to, the following method.

A method for manufacturing a foamed article using the resin composition for foaming includes: preparing a primary mixture by mixing and melting ethylene-vinyl acetate, a biodegradable resin bonding a monomer having a double bond, a filler, a processing aid, and an EVA MB (a master batch prepared by mixing and melting EVA and an inorganic additive in an extruder) in a pressing kneader extruder at 60° C. to 110° C. for 3 minutes to 10 minutes; preparing a secondary mixture by mixing and melting a cross-linking agent, a co-crosslinking agent, and a foaming agent with the primary mixture at 60° C. to 110° C. for 3 minutes to 10 minutes; repeatedly passing the secondary mixture through a calender roll three times and pelletizing the mixture at 80° C. to 120° C. to have a chip shape; and foaming at 100° C. to 200° C. for 200 seconds to 600 seconds in an injection foam molding machine.

Here, preparing a mixture may be carried out in a mixer, such as a Banbury mixer and a roll mill, generally used in the art instead of a kneader.

The EVA MB is a master batch prepared by mixing and melting ethylene-vinyl acetate and an inorganic additive in an extruder. Such a master batch is added to disperse inorganic additives well and improve compatibility.

Further, after mixing and melting as mentioned above, the resulting composition may be molded to have a sheet shape or a ribbon shape besides a pellet.

Further, a method of foaming may include a press foam molding method generally used in the art besides an injection foam molding method.

The obtained foamed article may be used as a sole, a midsole, or an insole of a shoe.

Hereinafter, the present invention will be described in detail with reference to Examples. However, it is clear that Examples are only provided for easy understanding of the present invention, but the present invention is not limited to Examples.

Preparation Example 1

Preparation of PBAF 1.15 mol of 1,4-butanediol (BDO), 0.95 mol of adipic acid (AA), 0.05 mol of fumaric acid, 0.3 g of tetrabutyl titanate, 0.1 g of triphenyl phosphate, and maleic acid as a branching agent in an amount of 0.58% by weight with respect to the weight of the adipic acid were mixed in a 500 ml reactor connected to a stirrer, a thermometer, and a vacuum pump and provided with a condenser including a thermometer at its upper part, and then a temperature of the reactor was increased. An esterification reaction was performed at 195° C. for 80 minutes. The reaction was ended at the time when a temperature at the upper part of the condenser of the reactor was decreased to 90° C. or less.

Then, a polycondensation reaction was performed to an intermediate product obtained from the esterification reaction at a temperature of 240° C. and a vacuum level of less than 1 torr for 135 minutes. As a result, a biodegradable resin was obtained.

Preparation Example 2

Preparation of PBAI 1.15 mol of 1,4-butanediol (BDO), 0.95 mol of adipic acid (AA), 0.05 mol of itaconic acid, 0.3 g of tetrabutyl titanate, 0.1 g of triphenyl phosphate, and maleic acid as a branching agent in an amount of 0.58% by weight with respect to the weight of the adipic acid were mixed in a 500 ml reactor connected to a stirrer, a thermometer, and a vacuum pump and provided with a condenser including a thermometer at its upper part, and then a temperature of the reactor was increased. An esterification reaction was performed at 195° C. for 80 minutes. The reaction was ended at the time when a temperature at the upper part of the condenser of the reactor was decreased to 90° C. or less.

Then, a polycondensation reaction was performed to an intermediate product obtained from the esterification reaction at a temperature of 240° C. and a vacuum level of less than 1 torr for 135 minutes. As a result, a biodegradable resin was obtained.

Example 1

Preparation of Biodegradable Foamed Article

With respect to 100 parts by weight of a resin mixing an ethylene-vinyl acetate resin (3388 Grade Product, DuPont) with a melt index of 0.8 g/10 min in the amount of 70% by weight obtained from polymerization of ethylene and vinyl acetate at the wt % ratio of 78:22 and PBAF (polybutylene-adipate-co-fumarate) of Preparation Example 1 of 30% by weight as a biodegradable polyester resin, a processing aid (stearic acid) of 0.2 parts by weight, EVA MB (EVA of 5 parts by weight, calcium carbonate of 5 parts by weight, and zinc oxide of 5 parts by weight) of 6 parts by weight, and a filler (talc) of 3 parts by weight were put into a kneader, and mixed and melted at 95° C. for 6 minutes to prepare a primary mixture. Then, dicumyl peroxide of 0.5 parts by weight as a cross-linking agent, triallyl cyanurate of 3 parts by weight as a co-crosslinking agent, and diazodicarbonamide of 3 parts by weight as a foaming agent were secondly put into the primary mixture in the kneader and mixed and melted with the primary mixture at 95° C. for 6 minutes to prepare a secondary mixture. The secondary mixture was allowed to pass through a calender roll three times to obtain uniformity. A uniformly mixed and melted composition was extruded from an extruder at a barrel temperature of 90° C., and then pelletized and dried.

Thereafter, the dried chip was injected into a mold (6 cm×18 cm×2 cm) through an injection foam molding machine, and foamed at 170° C. after 360 seconds. The foamed article (foaming degree of 163%) was aged for 6 hours to prepare a final foamed article.

Example 2

A foamed article was prepared in the same manner as Example 1, except that the PBAI (polybutylene-adipate-co-itaconate) of Preparation Example 2 as the biodegradable polyester resin was used instead of PBAF (polybutyleneadipate-co-fumarate).

Comparative Example 1

A foamed article was prepared in the same manner as Example 1, except that the biodegradable polyester resin was not used.

Comparative Example 2

A foamed article was prepared in the same manner as Example 1, except that PBA (polybutyleneadipate) as the biodegradable polyester resin was used instead of PBAF.

Comparative Example 3

A foamed article was prepared in the same manner as Example 1, except that PBSA (polybutylenesuccinate-co-adipate) as the biodegradable polyester resin was used instead of PBAF.

Comparative Example 4

A foamed article was prepared in the same manner as Example 1, except that PBS (polybutylenesuccinate) as the biodegradable polyester resin was used instead of PBAF.

Comparative Example 5

A foamed article was prepared in the same manner as Example 1, except that PBAT (polybutyleneadipate-co-phthalate) as the biodegradable polyester resin was used instead of PBAF.

Experimental Example 1

Performance Evaluation

The foamed articles prepared in Examples 1 and 2 and Comparative Examples 1 to 5 were measured in terms of the following items. The Results thereof are shown in the following Table 1 and Table 2.

Processability (Mold Releasability)

Whether or not a mixture mixed and melted in a pressing kneader extruder was mold-released well from a metallic surface was observed with the naked eye.

Tensile Strength ($kg/cm^2$)

Tensile strength means a value obtained by dividing a maximum load applied to a material by a cross-sectional area of a specimen. A specimen having a width of 6 mm and a thickness of 3 mm was prepared and tension strength was measured according to ASTM D412 standard. At this time, five specimens were used in the same experiment and a tension speed was 500 mm/min.

Tear Strength (kg/cm)

Tear strength means a value obtained by dividing a maximum force applied to a material to be torn from a cut by a thickness of a cut section. A specimen having a thickness of 3 mm was prepared and tear strength was measured according to ASTM D3574 and ASTM D634 standards. The specimen was measured five times at a measurement speed of 500 mm/min and an average value was obtained.

Hardness

Hardness means how hard a surface is. Hardness was measured under a load of 1 kg. A specimen having a thickness of 10 mm was prepared, and five hardest and flat points different from one another were set and hardness was measured by an Asker C-type durometer according to ASTM D2240 standard.

Split Tear (kg/cm)

Spilt tear means a value obtained by dividing a force required to tear a material in parallel with a line cut perpendicularly to a thickness by a width of a specimen. At this time, a specimen was prepared by cutting with a cutter so as to have a width of 15 cm, a length of 2.54 cm, and a thickness of 10 mm. Split tear was measured by using the specimen.

Compression Set (%)

A foamed article was cut to have a thickness of 10 mm and formed into a cylinder shape having a diameter of 30+0.05 mm to prepare a specimen. The specimen was measured according to ASTM D3547 standard. The specimen was put between two parallel metallic plates and a spacer having a thickness half a thickness of the specimen was inserted thereto and compressed. Then, the specimen was heat-processed in an air-circulation system oven maintained at 50+0.1° C. for 6 hours and taken out of a compressor. The specimen was cooled at room temperature for 30 minutes and a thickness thereof was measured. Here, three specimens were used in the same experiment and a compression set was calculated by the following Equation 1.

$$C_s(\%) = [(t_o - t_f)/(t_o - t_s)] \times 100 \qquad \text{[Equation 1]}$$

(Here, $C_s$ is a permanent compression set, $t_o$ is an initial thickness of the specimen, $t_f$ is a thickness of the specimen cooled after the heat process, and $t_s$ is a thickness of the spacer.)

Foamed Article Form

A form of a foamed article foamed in an injection foam molding machine and aged was observed with the naked eye in terms of a shape of the foamed article and uniformity in foam size.

TABLE 1

| Division | Mixed and melted resin | Composition ratio of mixed and melted resin | Kneader Processability (Mold releasability) |
|---|---|---|---|
| Example 1 | EVA:PBAF | 7:3 | OK |
| Example 2 | EVA:PBAI | 7:3 | OK |
| Comparative Example 1 | EVA only | — | OK |
| Comparative Example 2 | EVA:PBA | 7:3 | NG |
| Comparative Example 3 | EVA:PBSA | 7:3 | NG |
| Comparative Example 4 | EVA:PBS | 7:3 | NG |
| Comparative Example 5 | EVA:PBAT | 7:3 | NG |

TABLE 2

| Division | Evaluation items | | | | | | | |
|---|---|---|---|---|---|---|---|---|
| | Tear strength | Tensile strength | Hardness | Split tear | Compression set | Foamed article form | Foam size uniformity | Color |
| Example 1 | 30-32 | 12-14 | 53 | 2.3-2.5 | 60-61 | ◎ | ⊙ | ⊙ |
| Example 2 | 29-31 | 11-13 | 53 | 2.3-2.5 | 60-62 | ◎ | ⊙ | ⊙ |
| Comparative Example 1 | 20.0 | 10.0 | 51 | 2.5 | <60 | ◎ | ◎ | ◎ |
| Comparative Example 2 | 28-32 | 12-13 | 52 | 1.9-2.2 | 65-68 | ⊙ | ○ | ⊙ |
| Comparative Example 3 | 28-32 | 11-12 | 53 | 1.8-2.2 | 65-68 | ○ | ○ | ○ |
| Comparative example 4 | 29-32 | 11-13 | 53 | 1.8-2.2 | 66-69 | ○ | ○ | ○ |
| Comparative example 5 | 31-33 | 12-14 | 54 | 2.0-2.2 | 68-70 | ○ | ○ | ○ |

(◎: Very good, ⊙: Good, ○: Normal, Δ: Bad, X: Very bad)

As can be seen from Table 1 and Table 2, the foamed article according to the present invention has excellent processability, and higher tear strength, tensile strength, and hardness, and a similar compression set as compared with Comparative Example 1 without a biodegradable resin. Thus, it can be seen that the foamed article according to the present invention has an excellent mechanical property. Further, the foamed article according to the present invention has similar tear strength, tensile strength, and hardness, and a lower compression set as compared with Comparative Examples 2 to 5 including a biodegradable resin bonding a monomer without a double bond. Thus, it can be seen that the foamed article according to the present invention has an excellent foaming property such as uniformity in foam size and a form of the foamed article.

The present invention has the following effects.

Firstly, according to the present invention, a biodegradable polyester resin bonding a monomer having a double bond is applied to an ethylene-vinyl acetate resin so as to improve a compatibility with the ethylene-vinyl acetate resin.

Secondly, according to the present invention, the biodegradable polyester resin that is introduced with the monomer having a double bond is applied and the double bond in the biodegradable polyester resin can be chemically cross-linked to the ethylene-vinyl acetate resin by a cross-linking agent, so that processability (mold releasability) during a mixing and melting process can be improved, and a foaming property and a mechanical property of a foamed article can be remarkably improved.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A resin composition for foaming, comprising:
   an ethylene-vinyl acetate resin;
   a biodegradable polyester resin bonding with a monomer having a double bond;
   a cross-linking agent;
   a co-crosslinking agent; a filler; and
   a foaming agent,
   wherein the double bond in the biodegradable polyester resin is chemically cross-linked to the ethylene-vinyl acetate resin.

2. The resin composition of claim 1, wherein the biodegradable polyester resin is used in the amount ranging from 20% by weight to 50% by weight with respect to the ethylene-vinyl acetate resin.

3. The resin composition of claim 1, wherein the monomer having a double bond is included in a mole ratio of from 0.003 to 0.2 in the biodegradable polyester resin.

4. The resin composition of claim 1, wherein the biodegradable polyester resin is selected from polyester resins bonding with monomers having double bonds, wherein the monomers comprise unsaturated acids, unsaturated isocyanates, unsaturated alcohols, or unsaturated hydroxy carboxylic acids with two or more functional groups.

5. The resin composition of claim 4, wherein the biodegradable polyester resin is selected from PBAF, PBAI, PBSAF, PBSAI, PBSF, or PBSI.

6. The resin composition of claim 1, wherein the composition includes the cross-linking agent in the amount of 0.1 parts to 10 parts by weight, the co-crosslinking agent in the amount of 0.1 parts to 5 parts by weight, the filler in the amount of 0.1 parts to 5 parts by weight, and the foaming agent in the amount of 1 part to 10 parts by weight with respect to 100 parts by weight of the total weight of the ethylene-vinyl acetate resin and the biodegradable polyester resin.

7. A foamed article being foam-molded of a resin composition for foaming according to claim 1.

8. The foamed article of claim 7, wherein the foamed article is foam-molded by an injection foam molding method or a press foam molding method.

9. The foamed article of claim 7, wherein the foamed article is used as a sole, a midsole, or an insole of a shoe.

* * * * *